(12) United States Patent
Keffeler (10) Patent No.: US 11,754,219 B1
(45) Date of Patent: Sep. 12, 2023

(54) WATER FILTER SUPPORT BRACKET

(71) Applicant: David P. Keffeler, Omaha, NE (US)

(72) Inventor: David P. Keffeler, Omaha, NE (US)

( * ) Notice: Subject to any disclaimer, the term of this patent is extended or adjusted under 35 U.S.C. 154(b) by 0 days.

(21) Appl. No.: 17/551,534

(22) Filed: Dec. 15, 2021

(51) Int. Cl.
*F16M 13/02* (2006.01)
*B01D 35/30* (2006.01)

(52) U.S. Cl.
CPC ........... *F16M 13/02* (2013.01); *B01D 35/301* (2013.01); *B01D 35/306* (2013.01)

(58) Field of Classification Search
CPC .... F16M 13/02; B01D 35/301; B01D 35/306; B25H 3/04; A47B 81/005; A47F 7/0021; A47F 7/0028
See application file for complete search history.

(56) References Cited

U.S. PATENT DOCUMENTS

| | | | |
|---|---|---|---|
| 7,506,770 B2 * | 3/2009 | Rief | E04H 4/14 211/70.6 |
| D702,886 S * | 4/2014 | Bohman | D28/38 |
| 2010/0170862 A1 * | 7/2010 | Poisson | A63D 15/10 211/68 |

* cited by examiner

*Primary Examiner* — Terrell L McKinnon
*Assistant Examiner* — Jerry Olivier
(74) *Attorney, Agent, or Firm* — Suiter Swantz PC LLO (57) ABSTRACT

A one-piece bracket for supporting one or more water filters is disclosed. The bracket includes a horizontally disposed base plate. A wall extends upwardly from the base plate. A horizontally disposed first support plate extends rearwardly from the upper end of the wall at the upper rearward end of the wall. The first support plate has three semi-circular openings formed therein. A horizontally disposed second support plate extends forwardly from the upper end of the wall at the upper end thereof and has a semi-circular opening formed therein. A horizontally disposed third plate extends forwardly from the front side of the wall below the second plate and has a semi-circular opening formed therein. A water filter may be inserted into the semi-circular opening in the first plate. The semi-circular opening in the third plate acts as a guide.

5 Claims, 8 Drawing Sheets

WATER FILTER SUPPORT BRACKET

BACKGROUND OF THE INVENTION

Field of the Invention

This invention relates to a support bracket for supporting a plurality of water filters thereon. More particularly, this invention relates to a water filter support bracket which may support water filters thereon which have different sizes.

Description of the Related Art

In many water purification systems, one or more water filters are imposed in the system and are supported on many different types and designs of support brackets. Many of the prior art support brackets for water filters are comprised of multiple parts which increases the cost of manufacturing the same and increases the cost of installation thereof. Further, to the best of Applicant's knowledge, none of the prior art water filter support brackets are able to support water filters thereon which have different dimensions. Further, to the best of Applicant's knowledge, the prior water filter support brackets do not permit the water filters to be easily secured to the support brackets and to be easily replaced.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A one-piece bracket is provided for supporting one or more water filters thereon. The one-piece bracket includes a horizontally disposed base plate having an upper side, a lower side, a front end, a rear end, a first side and a second side. A wall extends upwardly from the base plate rearwardly of the front end of the base plate and inwardly of the first and second sides of the base plate. A horizontally disposed first water filter support shelf, having inner and outer ends, extends forwardly from the upper end of the wall and has three semi-circular openings formed therein.

A second support shelf extends rearwardly from the rear side of the wall below the upper end thereof. The second support structure has a semi-circular opening formed therein.

A third support shelf extends rearwardly from the lower end of an opening formed in the wall.

Water filters are supported in the U-shaped openings and may have different lengths. The bracket is comprised of a stainless-steel material.

It is therefore a principal object of the invention to provide a water filter support bracket which is of one-piece construction.

A further object of the invention is to provide a water filter support bracket which may support water filters of different dimensions.

A further object of the invention is to provide a water filter support bracket which is durable in use and refined in appearance.

A further object of the invention is to provide a water filter support bracket which is of one-piece construction thereby resulting in decreased manufacturing and installation expenses.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
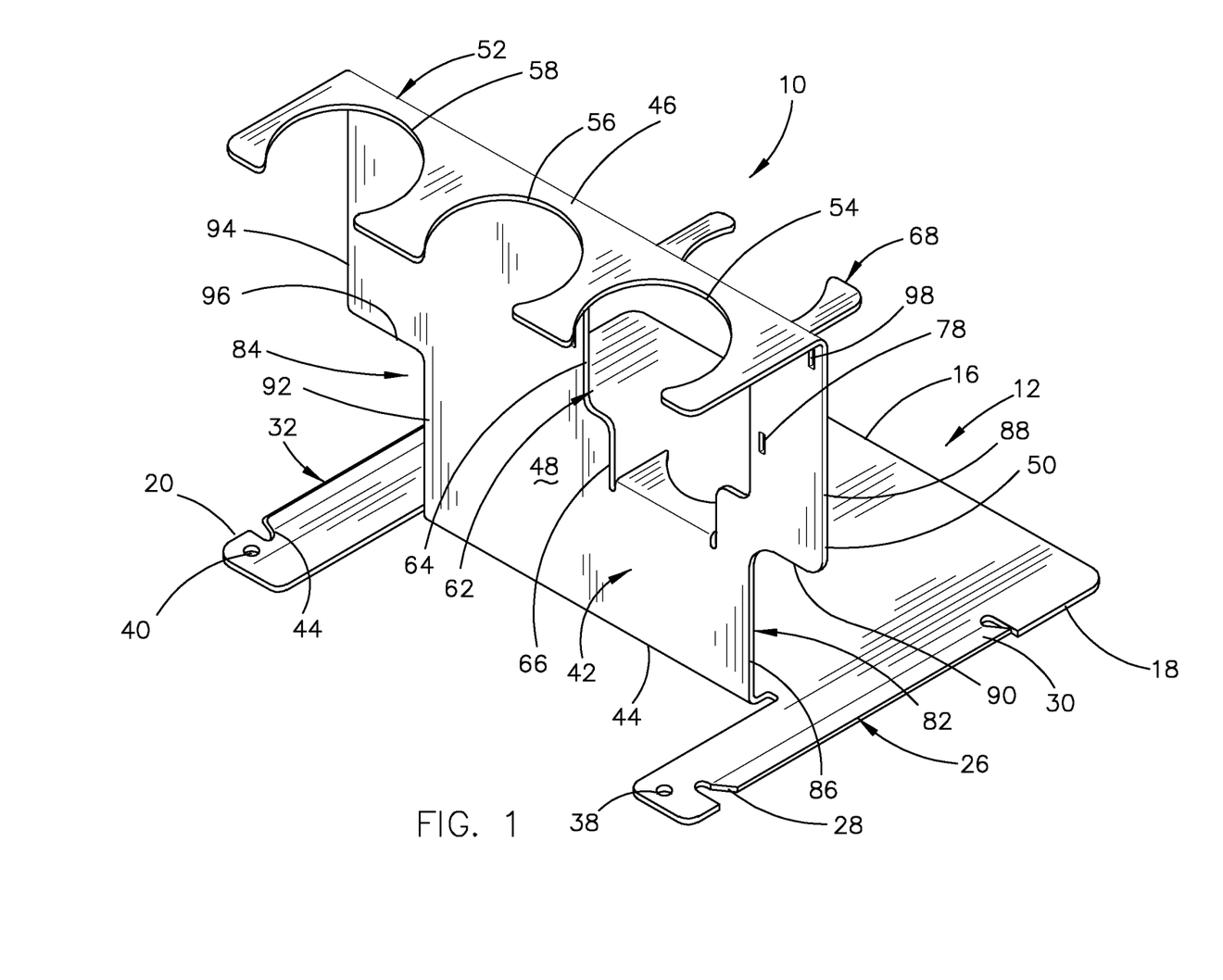
FIG. 1 is front perspective view of the water filter support bracket of this invention.
Figure 2:
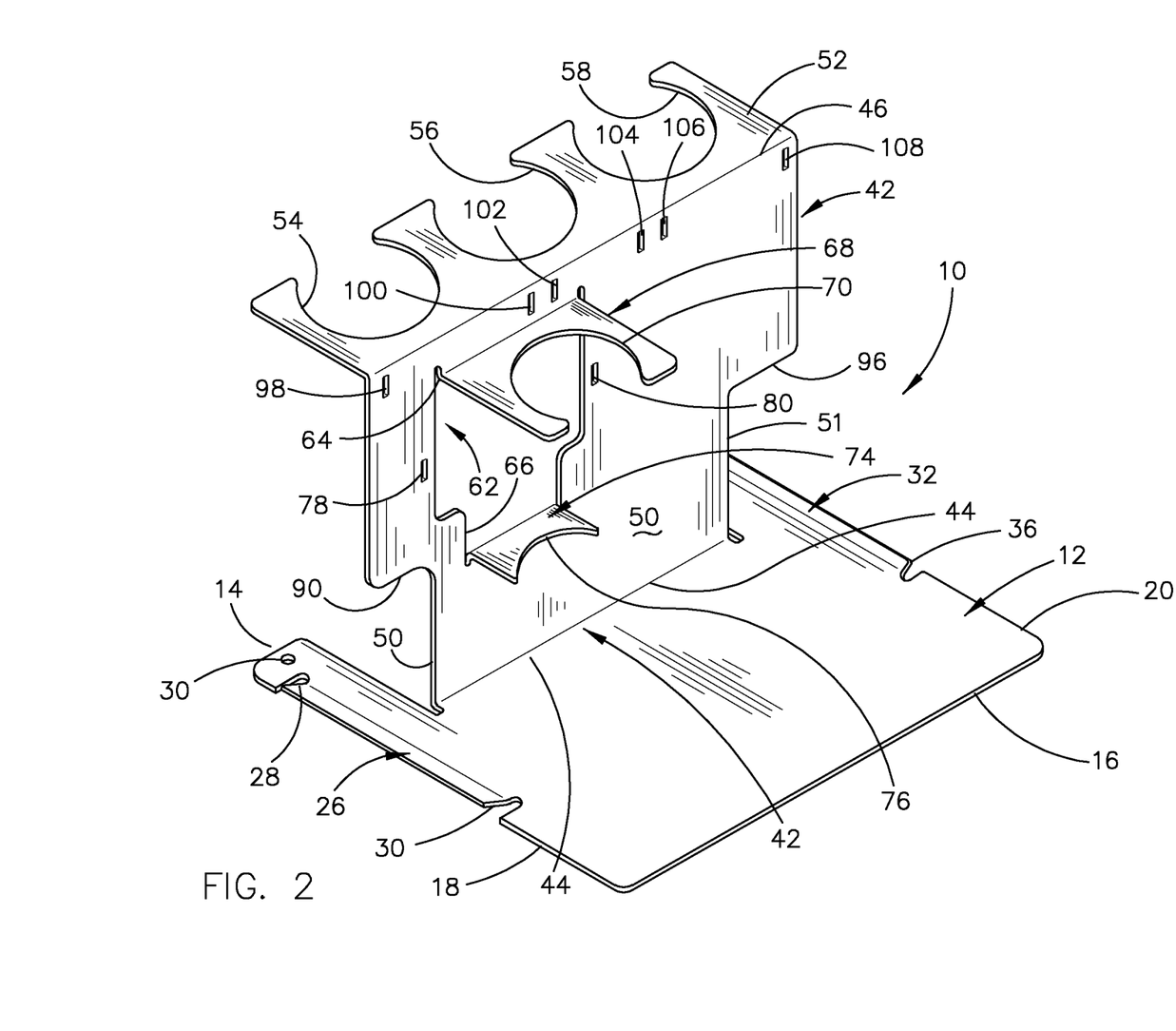
FIG. 2 is a rear perspective view of the water filter support bracket of this invention.
Figure 3:
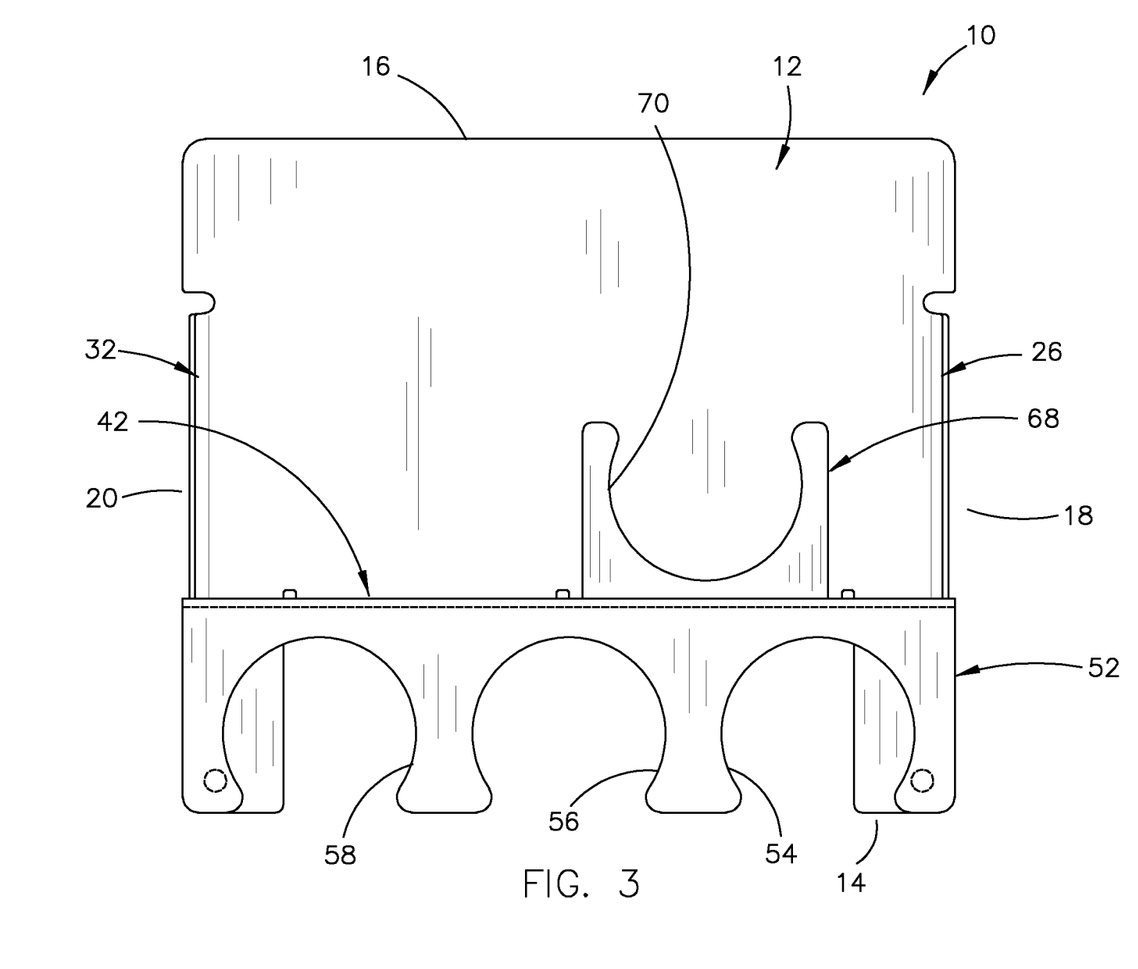
FIG. 3 is a top view of the water filter support bracket of this invention.
Figure 4:
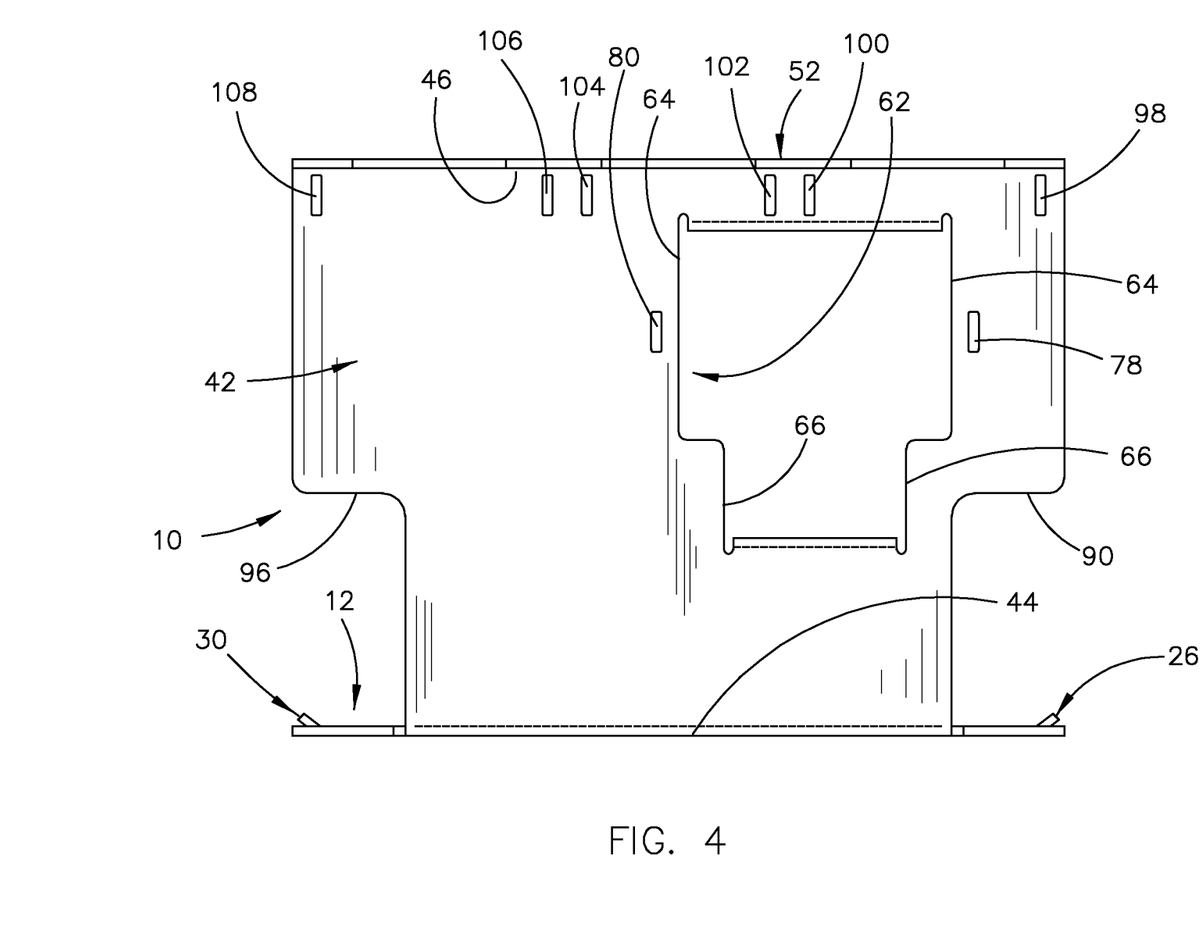
FIG. 4 is a rear view of the water filter support bracket of this invention.
Figure 5:
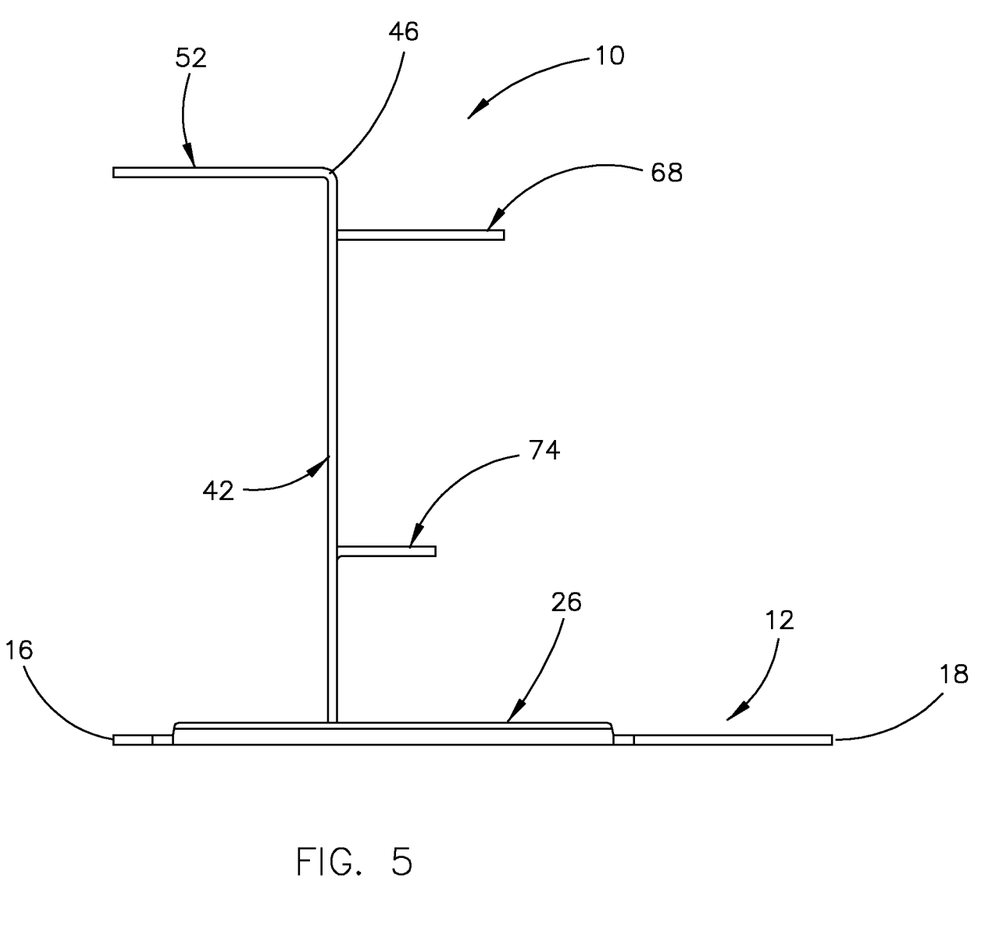
FIG. 5 is a side view of the water filter support bracket of this invention.
Figure 6:
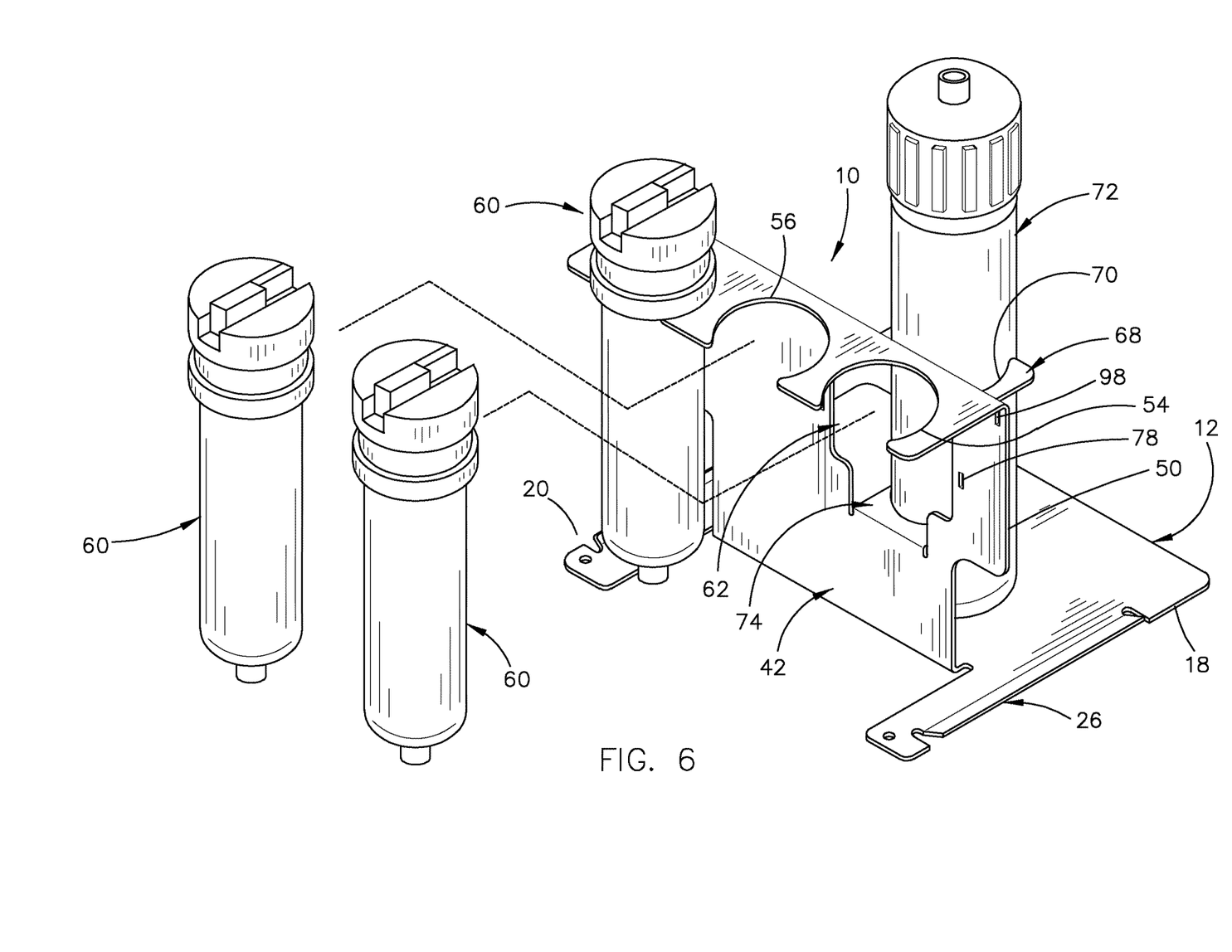
FIG. 6 is an exploded front perspective view of the water filter support bracket of this invention which illustrates two different sized water filters mounted on the water filter support bracket and which illustrates two additional water filters about to be placed in the water filter support bracket.
Figure 7:
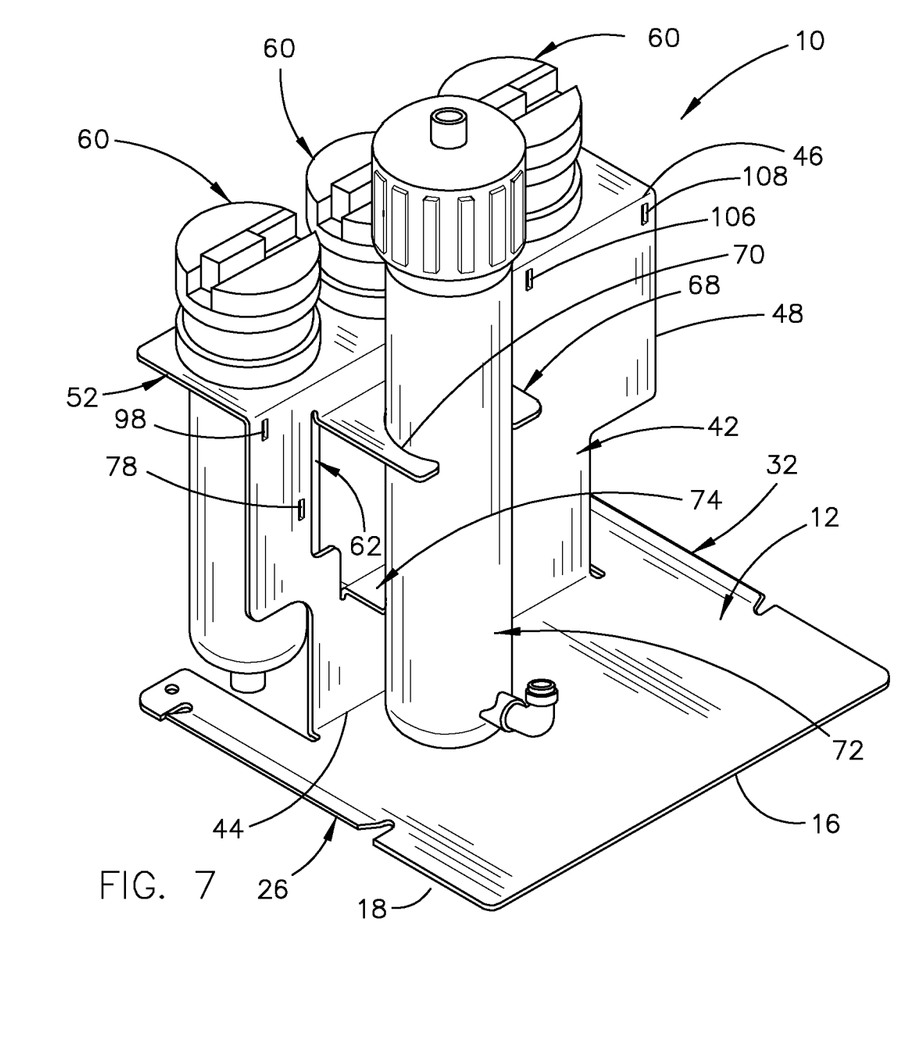
FIG. 7 is a rear perspective view illustrating four water filters positioned in the water filter support bracket of this invention.
Figure 8:
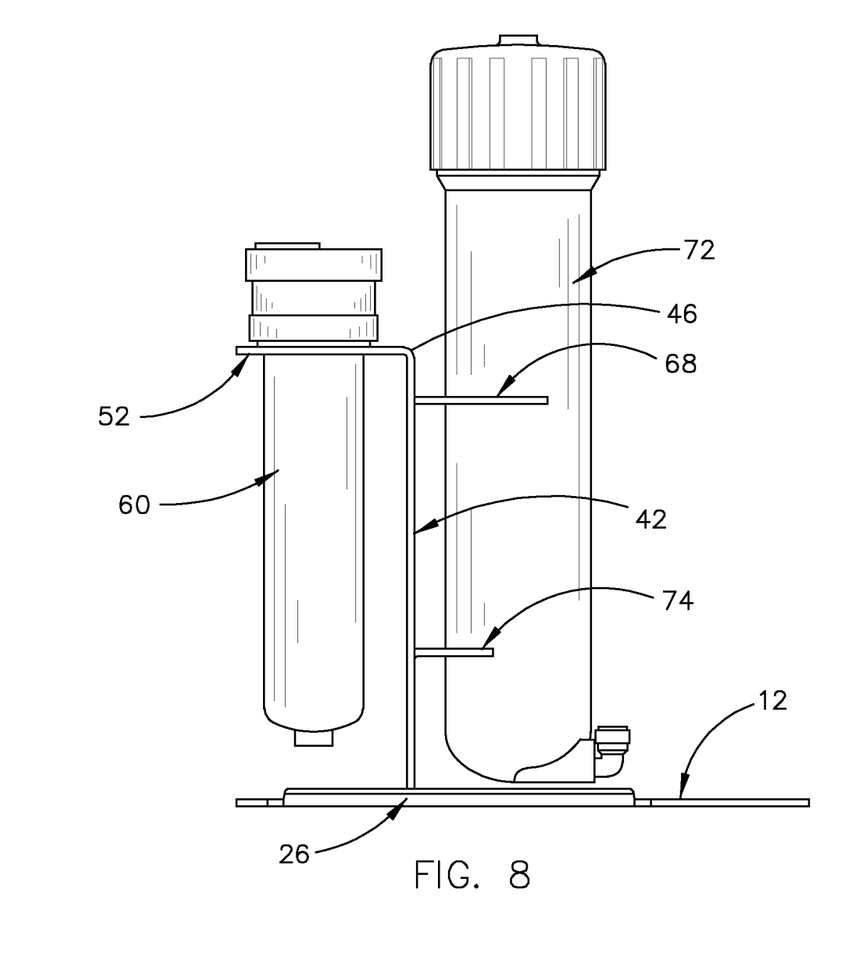
FIG. 8 is a side view of the water filter support bracket and the water filters of FIG. 7.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The one-piece bracket of this invention is designated by the reference numeral 10. Bracket 10 includes a horizontally disposed base plate 12 having a front end 14, a rear end 16, a first side 18, a second side 20, an upper side 22 and a lower side 24. The first side 18 of base plate 12 has an elongated lip 26 formed therein, having ends 28 and 30, which extends upwardly and outwardly therefrom. As seen, the end 28 of lip 26 is spaced inwardly from the front end 14 of base plate 12. As also seen, the end 30 of lip 26 is spaced forwardly from the rear end 16 of base plate 12.

The second side 20 of base plate 12 has an elongated lip 32 formed therein, having ends 34 and 36, which extends upwardly and outwardly therefrom. As seen, the end 34 of lip 32 is spaced rearwardly of rear end 16 of base plate 12. As also seen, the end 36 of lip 32 is spaced forwardly of front end 14 of base plate 12. Base plate 12 may have an opening 38 formed therein adjacent the juncture of front end 14 of base plate 12 and the first side 18 of base plate 12. Base plate 12 may also have an opening 40 formed therein adjacent the juncture of front end 14 of base plate 12 and the second side 20 of base plate 12.

The numeral 42 refers to a wall which extends upwardly from base plate 12 and which has a lower end 44, an upper end 46, a front side 48 and back side 50.

The upper end 46 of wall structure 42 has a horizontally disposed support shelf 52 extending therefrom. A plurality of horizontally spaced-apart and semi-circular openings 54, 56 and 58 are formed in shelf 52 as seen in the drawings. The semi-circular openings 54, 56 and 58 are each configured to receive and support a water filter 60 therein.

Wall 42 also has an opening 62 formed therein. Opening 62 includes an upper portion 64 and a lower portion 66. A support shelf 68 extends horizontally from the upper end of upper portion 64 of opening 62 at side 49 of wall structure 42 and has a semi-circular opening 70 formed therein which is configured to receive and support a water filter 72. Usually, the filter 72 will be longer than the water filter 60. A support shelf 74 extends from the lower end of opening 66 at side 49 of wall 42 and has a semi-circular opening 76 formed therein which is configured to receive the lower end of the water filter 72. As seen, the support shelf 52 extends outwardly from side 48 of wall 42 and that support shelves 68 and 74 extend outwardly from side 50 of wall 42. Wall 42 has a pair of spaced-apart rectangular openings 78 and 80 formed therein on opposite sides of upper portion 64 of opening 62 which enables a strap or tie to be extended therethrough to maintain the water filter 72 in place in the shelves 68 and 74. As seen, wall 42 has a first side edge 82 and a second side edge 84. Side edge 82 includes side edge segments 86 and 88 which form a shoulder 90. Side edge 84 includes side edge segments 92 and 94 which form a shoulder 96.

Wall 42 has a pair of spaced-apart rectangular openings 98 and 100 formed therein which enables a strap or tie to be extended therethrough to maintain a water filter in place. Wall 42 also has pairs of spaced-apart openings 102, 104, 106 and 108 formed therein which also enable straps or ties to be extended therethrough to maintain water filters therebetween.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A one-piece bracket for supporting one or more water filters thereon, comprising:
    a horizontally disposed base plate having an upper side, a lower side, a front end, a rear end, a first side and a second side;
    a wall extending upwardly from said base plate between said front and rear ends of said base plate inwardly of said first and second sides of said base plate;
    said wall having a lower end, an upper end, a first side, a second side, a front side and a rear side;
    a horizontally disposed first water filter support shelf, having inner and outer ends, extending rearwardly from said upper end of said wall;
    said first water filter support shelf having a plurality of horizontally spaced-apart semi-circular openings formed therein which are configured to receive a water filter therein;
    said second side of said base plate having an elongated upturned second flange having a first end and a second end formed therein;
    said first end of said second flange being spaced from said first end of said second side of the base plate;
    said second end of said second flange being spaced from said second end of said second side of the base plate;
    an upper horizontally disposed second shelf support, having inner and outer ends, extending forwardly from said front end of said wall, at said upper end thereof;
    said upper horizontally disposed second shelf support having a semi-circular opening formed therein;
    a lower horizontally disposed third shelf support, having inner and outer ends, extending forwardly from said front end of said wall, below said second shelf support; and
    said lower horizontally disposed third shelf support having a semi-circular opening formed therein.

2. The one-piece bracket of claim 1 wherein said wall has a width which is less than the width of said base plate.

3. The one-piece bracket of claim 1 wherein said base plate has an upstanding upturned first flange at said first side of the base plate and wherein said base plate has the elongated upturned second flange at said second side of the base plate.

4. The one-piece bracket of claim 1 wherein said first side of said wall has upper and lower segments which create a shoulder therebetween and wherein said second side of said wall has upper and lower segments which create a shoulder therebetween.

5. The one-piece bracket of claim 1 wherein said wall has a plurality of spaced-apart openings formed therein which are configured to receive a tie or strap extending therethrough.

* * * * *